United States Patent Office 2,823,179
Patented Feb. 11, 1958

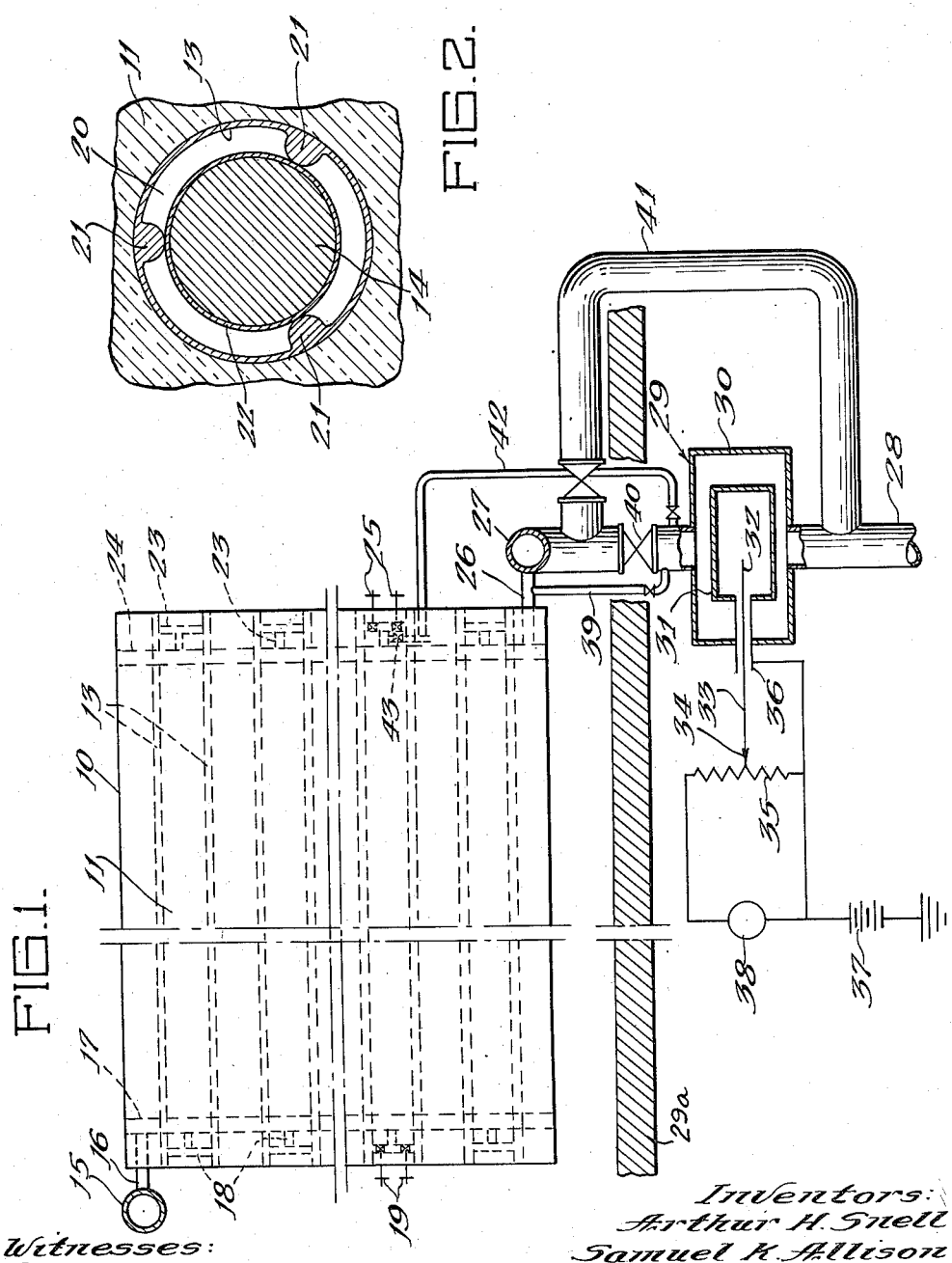

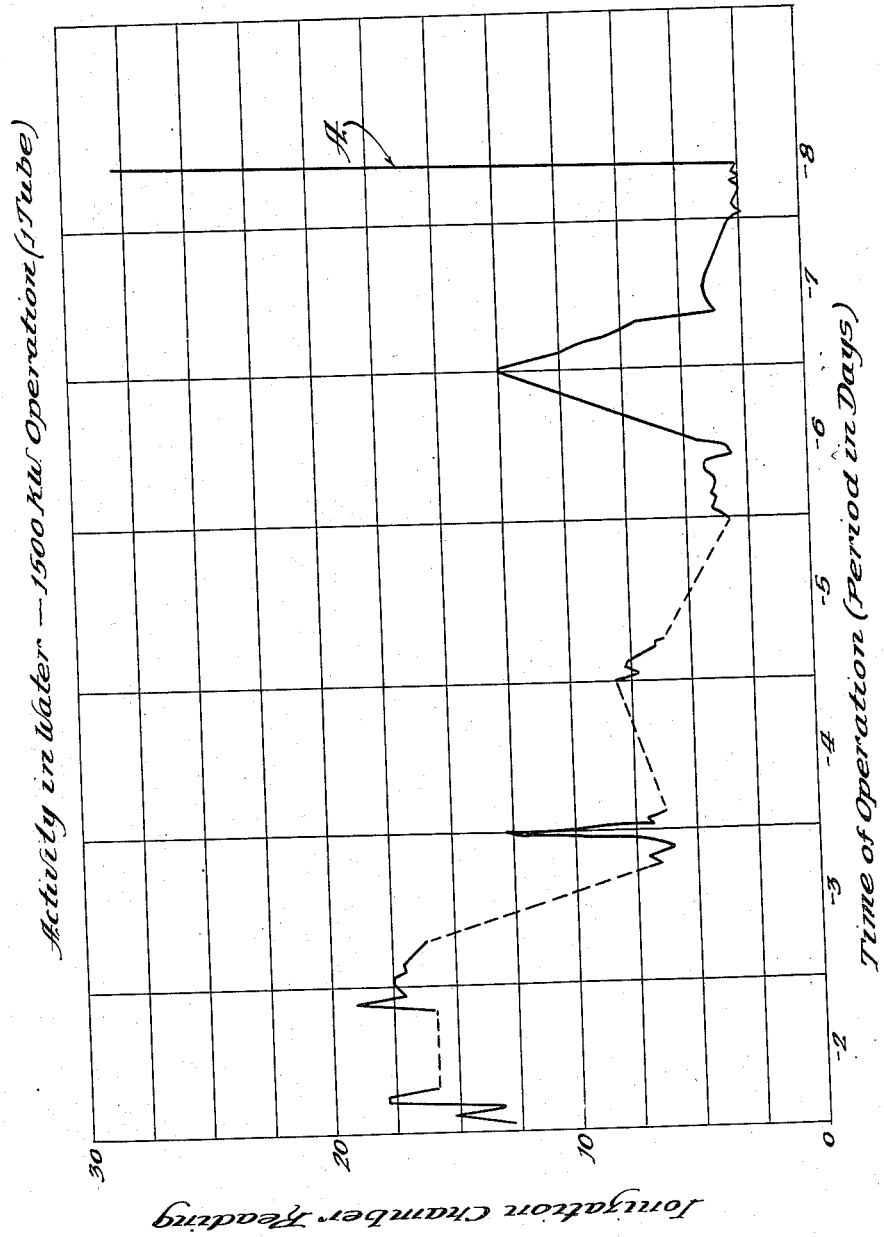

2,823,179

DETECTION OF COATING FAILURES IN A NEUTRONIC REACTOR

Arthur H. Snell, Oak Ridge, Tenn., and Samuel K. Allison, Chicago, Ill., assignors to the United States of America as represented by the United States Atomic Energy Commission Application October 16, 1945, Serial No. 622,632

2 Claims. (Cl. 204—193.2)

This invention relates to the general subject of neutronics, and more particularly to apparatus for detecting coating failures in neutronic reactors, such as the neutronic reactors disclosed and claimed in the copending application of Enrico Fermi and Leo Szilard, Serial No. 568,904, filed December 19, 1944, now Patent No. 2,708,656. This copending application discloses the general principles of self-sustaining neutron chain reacting systems operating by virtue of neutron fission of a fissionable component, such as uranium, for example, natural uranium having a $U^{235}$ isotope content of approximately $1/139$ of $U^{238}$, which is the preponderant isotope present.

A water cooled neutronic reactor of the type disclosed in the above-mentioned copending application may comprise a plurality of removable uranium bodies or rods, coated or jacketed, for example, with aluminum, and supported within the conduits through which the cooling water may circulate.

If water should enter the coating and reach the uranium, the uranium body will swell due to formation of uranium compounds, and this swelling, if permitted to continue, may eventually cause the body or rod to interfere with water flow through the conduit, thereby creating undesirable results due to the formation of steam in the blocked conduit, and if the swelling continues the body may become stuck in the conduit. It is thus desirable to determine a leak in a coating as soon as possible.

It has heretofore been proposed to monitor the gross radioactivity of the exit cooling water in neutronic reactor coolant tubes, and such methods will determine the presence of a coating failure if the background activity is low and the exposed uranium surface is large. However, in many cases impurities in the water itself and corrosion products uniformly removed from the conduit and jacket surfaces, can become sufficiently radioactive to mask the radioactivity due to a small leak in a coating until a dangerous condition is reached. To insure that even a small leak is detected, use is made, in the carrying out of the present invention, of the fact that delayed neutrons are emitted from fission fragments and that these delayed neutrons can be detected from the source of the fissions. In consequence, if uranium inside the reactor is exposed to the cooling water, delayed neutrons will be found in the cooling water. As the production of neutrons from other sources than fission is small, an indication of any substantial neutron activity in the exit cooling water is prima facie evidence of the exposure of uranium to the coolant.

It is an object of this invention to provide a novel apparatus for detecting a failure in the coating of uranium bodies within a fluid cooled neutronic reactor.

To summarize, the present invention is concerned with a novel apparatus for the detection of coating failures in coated uranium slugs within the coolant tubes by the detection of a sudden rise in the neutron activity of the exit coolant.

Other objects and advantages of the present invention will become apparent from the following description read in conjunction with the drawings, in which:

Figure 1 is a diagrammatic view illustrating a neutronic reactor and the cooling system therefor, and also illustrating apparatus particularly adapted for the detection of delayed neutrons in the coolant;

Figure 2 is a cross section taken through a coolant tube illustrating in section a portion of the moderator surrounding the coolant tube and an aluminum-coated uranium slug positioned within the coolant tube; and Figure 3 is a graph illustrating the activity of water upon the occurrence of a break in the slug coating.

A neutronic reactor system with which the present novel method of and apparatus for detection of coating failures may be used, comprises broadly a power unit including a neutronic reactor, a complete heat extracting or cooling circuit adapted to remove heat from the reactor, and an effective control system for regulating the operation of a neutronic reactor. It is preferred to illustrate the present invention in conjunction with a reactor employing sheathed uranium rods positioned within coolant tubes which are disposed in a graphite moderator, with a suitable coolant flowing through the coolant tubes and over the sheathed uranium rods.

Referring to Figures 1 and 2, the reactor is generally indicated at 10 and comprises broadly a graphite moderator 11 and a plurality of passages 20 lined with aluminum coolant tubes 13 extending throughout the width of the graphite. It is preferred that the passages be arranged in a geometrical arrangement known as a lattice structure and the tubes may be arranged either vertically, or horizontally as illustrated, depending upon the particular type of reactor. Jacketed uranium slugs 14 are placed end to end in the aluminum tubes 13. The reactor is provided with the customary control and safety rods (which are not shown) of neutron absorbing material insertable in the reactor to maintain the desired level of power.

Suitable cooling is provided for the reactor 10. The particular circulatory system will only be described with reference broadly to the monitoring of the coolant discharged from the reactor to determine whether there have been any failures of the sheathed uranium bodies within the coolant tubes of the reactor.

Irrespective of the form the reactor may take, power may be extracted by circulating a coolant through the reactor in heat exchange relationship with the uranium slugs. If the power unit is located near a relatively pure body of water such as a river of sufficient size to supply the necessary quantity of water to extract the required amount of heat, then this river water can be passed through the reactor after being processed to obtain the required purity. In the event that a natural body of water is not available, then a supply of coolant must be provided. In this event, it is desirable to recirculate the coolant through the reactor many times and thus reduce to a minimum the total quantity required.

For the purpose of illustration in Figure 1, the water inlet header to the reactor 10 is illustrated at 15. From the water inlet header 15, the water is distributed through piping 16 to a series of vertical headers 17. It is preferred to distribute the coolant from the header 17 to pairs of coolant tubes 13 by piping 18 which discharges into each tube 13, and the flow of water to each of the tubes may be controlled by individual inlet control valves 19 to each of the tubes. For the purpose of simplicity, however, only one set of valves has been illustrated;

and, it is to be understood that each of the coolant tubes 13 is individually controlled by the valves 19 as described. In this manner, the flow of coolant to the tubes may be adjusted or completely shut off, depending upon the operating conditions of the reactor.

Referring to Figure 2, each of the tubes 13 is preferably constructed as illustrated to provide a suitable passage 20 for the coolant between the uranium body 14 and the coolant tube 13. The uranium bodies 14 are preferably supported by ribs 21 formed on the inner surface of the coolant tubes 13 to centrally locate the uranium rods with the coolant tubes and to maintain a uniform passage 20 for the coolant through the tubes. The uranium slugs 14 are preferably sheathed with aluminum sheathing 22 closely applied and sealed, as by welding.

The coolant on the discharge end of the coolant tubes is discharged through piping 23, similar to piping 18 on the inlet side, connecting two tubes to a vertical discharge header 24. As on the inlet side, the piping 23 is provided with valves 25 for controlling the flow of the coolant from the tubes 13. The vertical discharge headers discharge through piping 26 to an outlet header 27 which carries off the entire flow of coolant through piping 28 where the heated coolant may be discharged into a suitable heat exchange system for extracting the heat; whereupon, the coolant may then be discharged or returned to the reactor.

In accomplishing the objects of this invention in the detection of jacket breaks or corrosion holes within the reactor, it is preferred to place a neutron detector 29 within the discharge piping 28 as illustrated in Figure 1. The detector 29 is illustrated in Figure 1 in the form of a chamber suitable for counting delayed neutrons, for example. A shield 29a is disposed between the reactor 10 and the radiation detector 29. The outlet piping 28 for the coolant is enlarged at 30 forming a chamber to receive the coolant. Positioned within the chamber is a chamber 31 suitably supported so that the cooling water entirely surounds the chamber 31 and serves to form a moderator to produce slow neutrons from delayed neutrons emitted from fission fragments that might be present in the coolant. The chamber 31 is preferably filled with boron fluoride and is primarily responsive to neutrons.

A central electrode 32 is provide within the chamber 31 and is connected to wire 33 leading outside the reactor to a movable slider 34 on a resistor 35. The resistor 35 is shunted across, one end of the resistor 35 being connected to an outer wire shield 36 and to a battery 37 of about 450 volts potential, the other end of which is grounded. The casing of the chamber 31 is grounded through the coolant. The other end of the resistor 35 is shunted through a galvanometer 38 to the shield side of the battery 37. Neutron absorption in the chamber causes alpha ray ionization in the chamber, the amount thereof being measured by the galvanometer 38.

Only the chamber 31 need be placed in a coolant fluid, the galvanometer being positioned up to several hundred feet away. As the delayed neutron density caused by failures of the aluminum sheathing 22 of the uranium bodies 14 bears a definite relationship with respect to the size of the failure and the velocity of the flow of the coolant, it is desirable that the delayed neutron detector shall be placed sufficiently close to the reactor but at such a distance that the most intensely radioactive isotopes formed within the coolant because of the irradiation of impurities therein shall not have any substantial background effect on the readings of the delayed neutron detector. It has been found that leaks may most readily be detected when the coolant water takes from 5 seconds to substantially 60 seconds in going from the coating failure to a neutron counter placed in the stream of water. The galvanometer deflection is only approximately linear with the delayed neutron density, but is reproducible and readily calibrated in terms of a delayed neutron density within the coolant.

Although the delayed neutron detector 29 has been described with reference to the monitoring of all the water as discharged from the reactor, it is also within the scope of this invention to specifically locate a break occurring within the sheathing of the rods within any tube 13 or in any particular bank of tubes connected to a vertical discharge header 24. It is evident that once there is an indication of delayed neutrons within the coolant discharged from the reactor that this break may be traced by monitoring with the coolant from each vertical header within the reactor and then if delayed neutrons are found in the coolant from a specific vertical header that by monitoring the coolant from each of the tubes connected to the header in question, the individual tube may be found in which the break occurs.

In order to monitor the coolant from each vertical header 24, suitable valve controlled piping 39 is connected to the piping 28 ahead of the delayed neutron detector 29 and to the piping 26. A valve 40 is placed in the piping 28 to shut off the flow of the coolant throughout the detector 29 with the exception of the coolant flowing through the pipe 26 which is to be monitored. A valve controlled by-pass 41 is provided about the delayed neutron detector 29 to carry off the remaining flow of the coolant so that the coolant may flow through the reactor while coolant from a particular vertical header is being monitored. It is obvious that the piping 39 may be individually connected to all of the pipes 26 to the vertical headers 24 or the piping 39 through flexible tubing may be connected to any pipe 26 as it is desired to individually monitor the respective headers 24. Likewise in order to monitor each of the tubes 13, suitable valve controlled flexible piping 42 is connected as illustrated in Figure 1 to the valve controlled piping 23 connecting a pair of coolant tubes. By suitable operation of valves 25 and 43, the coolant from an individual tube may be suitably monitored until the break within the sheathed uranium slugs has been found. Although for the purpose of illustration in Figure 1, the tubing 42 is shown connected to one set of tubes, it is evident that each tube connected to a specific vertical header 24 may be monitored by detaching the flexible tubing 42 and connecting it to another piping 23.

The delayed neutron detector 29 has been described with reference to the monitoring of all the water as discharged from the reactor, to monitoring a series of coolant tubes connected to a discharge header, and to monitoring a single coolant tube for the formation of delayed neutrons in the event of a failure in the sheathed uranium slugs within the coolant tube. It is also within the scope of this invention that the various groups of coolant tubes may be connected to a single detector, utilizing a battery of detectors for the higher number of tubes since there may be 1700 to 2000 cooling tubes in a reactor operating at substantially 200,000 kilowatts. This arrangement is convenient for rapidly determining coating failures befor substantial damage occurs in the coolant tubes due to, for example, the swelling of a punctured slug.

There are two mechanisms which can cause delayed neutron emission in the cooling water when there is a hole in a protective jacket covering the uranium: (1) corrosion of the uranium metal leading to traces of the uranium or other fissionable material being carried off in the water and being fissioned on the way, and (2) fission fragments projected from the exposed surface of the uranium and being carried off by the water. The second process will give almost $10^4$ times as much delayed neutron activity as the first because about $10^4$ times more metal will be contributing fission products for each $cm.^2$ of the exposed surface. Assuming that one quarter of the fission fragments escape from a surface layer of $10^{-3}$ grams per $cm.^2$ of the metal, and supposing that these are carried in a stream of water flowing at the rate of F cubic centimeters per second through a tube of volume $v_0$ to an enlarged portion of the pipe in which a $BF_3$ counter is placed, the number of counts observed in a time $t$ will be given by the expression:

No. of counts in time $$t = \frac{10^{-3}}{4} \cdot a \cdot \frac{N\sigma}{A} \cdot \alpha \cdot m \cdot nvt \cdot$$

$$\left( e^{-0.28\frac{v_0}{F}} + e^{-0.10\frac{v_0}{F}} + 0.8 e^{-0.03\frac{v_0}{F}} \right) \cdot E \cdot \frac{V}{F}$$

where $a$ is the area of exposed metal in cm.$^2$;
$N$ is $6 \times 10^{23}$;
$\sigma$ is $4.6 \times 10^{-24}$ cm.$^2$;
$A$ is 235;
$m$ is 2.3 neutrons per fission;
$\alpha$ is 0.007 (fraction of neutrons that are delayed);
$nvt$ is the number of slow neutrons which pass through 1 cm.$^2$ in time $t$;
The exponential factors allow for decay of the products during the time $v_0/F$ required to reach the counter;
$E$ is the efficiency of counting; and
$V$ is the effective volume of water surrounding the counter, from which the delayed neutrons might be counted.

This formula involves three assumptions: (1) that each delayed neutron emitting fragment emits one delayed neutron; (2) that the decay of the products can be neglected during the short interval during which they are near the counter; and (3) that none of the products stick in the tubes.

Putting in the known numerical factors and assuming that $v_0/F$ is five seconds, (1) reduces to No. of counts in time $t = 3.7 \times 10^{-8} anvtEV/F$ The above formula and the assumptions, for example, may be effectively applied to monitor a neutronic reactor of the type and size disclosed in the application cited above. Assuming $nv$ equal $10^{12}$ for this type of reactor, and using an enlargement (12 inches in diameter and 18 inches long) arranged close to one of the headers with the $BF_3$ counter placed in this enlargement. When the counter has a total boron absorption cross-section of 2.5 cm.$^2$, then a value of $10^{-3}$ for $E$ is reasonable. $F$ (the rate of flow in the tube with failure) was 2.6 pounds of water per second, or 1200 cubic centimeters per second. The activity in each 1200 cubic centimeters from the tube with the failure can be diluted by the number of tubes feeding the counter, as for example, 20. Then from the above formula No. of counts per second =
$3.7 \times 10^{-8} a \times 10^{12} \times 10^{-3} \times 40/1.2 \times 20 = 62a$ Thus a counting rate of 1 per second will reveal an open coating failure of 1.5 square millimeter in area.

An important consideration is that the success of the method is contingent upon the reduction of the background neutron count to a value which will not overshadow the counting rate of 1 per second. When the background count is reduced sufficiently, the sensitivity in the method of detecting delayed neutrons can be still further extended by using larger counters. Neutrons from the neutronic reactor can be kept from the counter by adequate shielding, and the background neutrons which might come directly from the water have been found to be low. The radioactivity of the cooling water has also been found to be low.

The monitoring system as above described has made it possible to detect a coating break in a monitored tube before there is a serious increase in activity of the water or piping. The curve of Figure 3 shows the activity record during the time a break occurred in a jacketed slug in a water tube when the reactor was operating at 1500 kilowatts, the dashed lines between solid portions of the curve indicating periods of reactor shutdown. The rapid rise of the activity which may be ascribed to delayed neutron emission is clearly shown at A on the curve. After being discharged from the tube, the jacketed uranium slugs within the tubes were examined. The jacketed slug where the break occurred in the jacket showed large pimples on the side opposite the break. The break was 9 feet from the center of the tube and the slug probably would have stuck in the tube had operations been continued for several more hours.

While the above invention has been described with reference to the use of water as a cooling medium, it is to be understood that this is merely illustrative since other liquids, such as diphenyl, deuterium oxide, or other liquids or fluids may be used which do not absorb neutrons to an excessive degree. Although the invention has been disclosed in connection with a reactor using graphite moderator, it is also obvious that the invention may be used with other moderators such as beryllium.

Furthermore, although the invention has been described with reference to the use of natural uranium, it should be noted that other compositions are capable of fission. It is also possible to use enriched compositions obtaining higher concentrations of fissionable isotope than exist in natural uranium. Generally speaking, a neutronic chain reaction may be conducted with various materials which yield a surplus of neutrons upon fission by neutrons, such as, for example, $U^{233}$, $U^{235}$, and $94^{239}$.

While the theory of the nuclear chain fission mechanism within a neutronic reactor is based on the best presently known experimental evidence, it is not desired to be bound thereby as additional experimental data later discovered may modify the theory disclosed. Any such modification of theory however will in no way effect the results to be obtained in the practice of the invention herein described and claimed.

What is claimed is:

1. A device for detecting leaks in the jackets of jacketed bodies of fissionable material comprising a neutronic reactor, a tube extending through the reactor adapted to contain the body to be tested, a source of water connected to one end of the tube, a pipe exterior to the reactor connected to the other end of the tube of the reactor, a neutron counting means mounted in said pipe, and neutron shielding means disposed between the neutron counting means and the reactor.

2. A device for detecting leaks in the jackets of jacketed bodies of fissionable material comprising a neutronic reactor, a tube extending through the reactor adapted to contain the body to be tested, a source of water connected to one end of the tube, a neutron detector exterior to the reactor including a pipe connected to the tube having an enlarged portion, a counter casing disposed centrally within the enlarged portion of the pipe and spaced therefrom, a central electrode disposed within the casing, and an atmosphere of $BF_3$ in the casing, and neutron shielding means disposed between the enlarged portion of the discharge pipe and the reactor.

References Cited in the file of this patent

UNITED STATES PATENTS

| | | |
|---|---|---|
| 2,288,718 | Kallmann et al. | July 7, 1942 |
| 2,500,223 | Wells et al. | Mar. 14, 1950 |
| 2,558,919 | Zinn | July 3, 1951 |
| 2,564,626 | MacMahon et al. | Aug. 14, 1951 |
| 2,708,656 | Fermi et al. | May 17, 1955 |

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |
| 233,278 | Switzerland | Oct. 16, 1944 |

(Other references on following page)

OTHER REFERENCES

Anderson et al.: Phy. Rev. 56, 284-6 (1939).

MDDC-879 U. S. Atomic Energy Comm., "The Absolute Measurement of Thermal Neutron Density," by H. L. Anderson, P. G. Koontz, J. H. Roberts. Date of Manuscript August 7, 1942. Date declassified January 2, 1947. Pp. 1-4.

Business Week, September 1, 1945, pages 58-64.

"A General Account of the Development of Methods of Using Atomic Energy for Military Purposes," by H. D. Smyth, August 1945, pages 28, 29, 84-87, 103, 69, 106, 174-176, 170.